Dec. 9, 1958   P. A. MARSAL ET AL   2,864,009
CONSTANT FREQUENCY BATTERY OPERATED RELAXATION OSCILLATOR
Filed Nov. 20, 1956
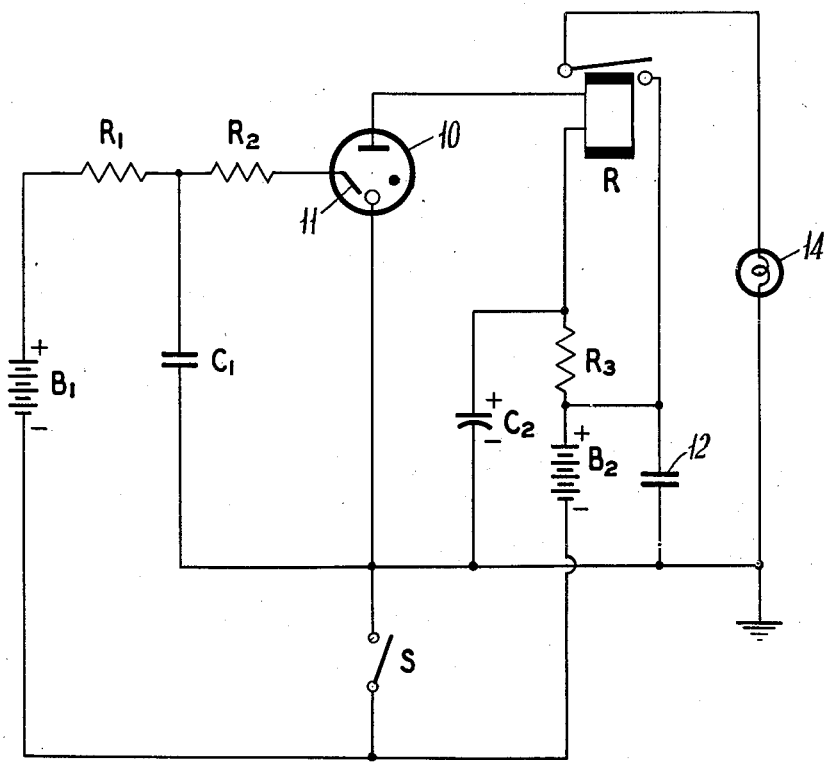
INVENTORS
NORMAN M. POTTER
PAUL A. MARSAL
BY *Gerald R. O'Brien Jr.*
ATTORNEY

2,864,009
CONSTANT FREQUENCY BATTERY OPERATED RELAXATION OSCILLATOR

Paul A. Marsal and Norman M. Potter, Rocky River, Ohio, assignors to Union Carbide Corporation, a corporation of New York Application November 20, 1956, Serial No. 623,452

4 Claims. (Cl. 307—132)

This invention relates to a relaxation oscillator and has for an object to render the frequency thereof substantially constant and independent of battery voltage for the load circuit.

It is a further object of this invention to provide a unique load circuit for the oscillator wherein a load device controlled by the oscillator is operated from the plate supply battery by connecting the load device in parallel with the tube.

It is a still further object of this invention to provide a condenser for use with the plate supply battery which reduces instantaneous current drain and increases the effective battery life.

In flashing lamps mounted on floating buoys it has been customary to rely on the frequency of flashes as an indication of the location of the buoy at night. This requires reliability in periodicity, in order to avoid being misleading. Heretofore some mechanical or electrical means for maintaining a fixed frequency of flash has been relied on. It has been known that a relaxation oscillator gives good results using a dry battery but an objection has been that the battery resistance increases and voltage decreases during discharge. This results in a change in the time required for a condenser to reach the ionization potential of a gaseous discharge tube, which thus effects a substantial change in the frequency of flashes from a lamp that is associated with the load circuit from such an oscillator. A pendulum of given length is a fairly reliable way of obtaining a fixed frequency of circuit actuation when mounted on a stable support, but such is not adapted to floating buoys because the movement of the buoy renders the pendulum motion non-uniform and unreliable. Another possible method of obtaining a constant repetition pulse would be by means of a rotary switch driven by a synchronous motor to interrupt a suitable circuit. However, the power consumption of a motor and the unavailability or impracticality of an alternating current power supply on a buoy preclude the use of such a frequency source. There are also many flasher units available wherein bimetallic contact strips provide interrupting means in the current path, but these units are affected by ambient temperatures and are further basically unstable as regards their frequency of flashing. This device overcomes all of these difficulties in that the pulse rate is extremely steady, it is very simple and rugged, it is lightweight and compact, and a maximum amount of the power available in the power supply is used for lighting purposes.

This application is a continuation-in-part of application Serial No. 350,622, filed April 23, 1953.

According to this invention a fixed frequency of circuit actuation is now available using dry batteries and without the expense of a synchronous motor or the weight of a pendulum. Specifically, a trigger circuit is connected to the grid or control electrode of at least a three electrode gaseous discharge tube and the small battery current used controls the ionization potential of the tube irrespective of a fairly large change in voltage of the battery supplying the output or load circuit.

The single figure of the drawing shows a preferred embodiment of this invention.

Considering the tube 10 to be a diode and disregarding the grid circuit, under the prior art it has been suggested to have a load circuit containing a flashing lamp operated by the discharge of a condenser C-2 passing through the gaseous discharge tube. On reaching the ionization potential of tube 10 the condenser discharges through the plate load circuit, said tube functioning as a switch to close the circuit. A dry battery B-2 supplies charging current for the condenser C-2 through a resistance whose value determines the rate at which the condenser becomes charged. An objection to this proposal has been the fact that the frequency of discharge varies as the battery voltage decreases.

To overcome the disadvantages of the prior art this invention substitutes at least a three electrode gaseous discharge thyratron in the load circuit. As is usual in a triode, the plate voltage becomes a much less important factor in the tube operation than in a diode and substantial variations in the plate voltage may occur without affecting the ionization potential of the tube as applied to the grid or the plate current itself. A grid 11 is connected to a triggering circuit comprising a dry battery B-1 for charging the condenser C-1 through a resistance R-1. When the condenser C-1 reaches a potential sufficient to cause ionization of the tube 10 plate current flows and a small current from the condenser C-1 discharges through the grid 11 and a resistance R-2 and the tube cuts off again. In this case the condenser C-2 no longer controls the ionization potential of the thyratron 10 and a change in voltage of the battery B-2 within fairly wide limits or a change in value of the resistance R-3 no longer affects or determines the firing of the plate load circuit. That is now determined primarily by the triggering circuit connected with the grid 11. Preferably, the condenser C-2 should be fully charged to its desired potential for each impulse in advance of the grid 11 reaching its desired potential. The relay R in the plate circuit of tube 10 is a common electromagnetic relay with a spring loaded armature that closes the circuit containing lamp 14 only as long as a pulse is produced by the oscillator.

By way of illustration, it has been found that for a frequency of 50 flashes per minute supplied to the plate load circuit the following values were found appropriate for use with a IC21 tube:

| | | |
|---|---|---|
| B1 | volts | 90 |
| R1 | megohms | 12 |
| C1 | mfd | 0.1 |
| R2 | ohms | 50,000 |
| B2 | volts | 135 |
| R3 | ohms | 100,000 |
| C2 | mfd | 4 |

It was found that the present invention gave a fixed frequency of discharge into the plate load circuit over a wide range of voltage from the battery B-2. The battery B-2 had its life increased 300% because it could be used for a longer time and still give the same constant frequency of discharge. A larger condenser C-2 is appropriate where higher output is desired. An increase in the resistance R-1 or an increase in the capacity of the condenser C-1 is each effective in increasing the time required for the condenser C-1 to charge to its appropriate potential for ionizing the tube 10. The battery B-1 was found to contribute only 3.75 micro amperes in charging the condenser C-1 in obtaining the 50 flashes a minute previously referred to and this current value is so small that a small hearing aid type battery of the voltage indicated was found suitable. Where this invention is to be used for example only during the night, the life of the batteries may be prolonged by inserting a manual switch S, between battery B-1, battery B-2 and ground in order that neither battery has to supply leakage current to the condenser during daylight hours.

The frequency stability of this circuit arrangement further makes it possible to use a novel primary load circuit wherein both the primary load which in the disclosed embodiment is a signal lamp 14, and the plate supply for the oscillator are supplied from the same battery. The possible detrimental effect on the frequency stability due to the greater battery load and consequent voltage reduction of the plate supply battery is obviated by the previously described stability occasioned by the grid controlled tube. The use of this circuit arrangement makes possible further reduction in weight and size as only one power source of any appreciable size needs to be included in the unit. A further advantage of the arrangement is that full operating current for the lamp does not have to pass through the tube as in a number of prior art devices thus giving a longer tube life.

This invention is adapted for other purposes than the actuation of flashing lamps on floating buoys, for example, the repeated discharges may work motion display devices such as are used in advertising displays and for this purpose it possesses the advantage that no auxiliary mechanical switch contacts are present to become corroded. This invention might also be used for an electric energizer, displacing the need for a pendulum sometimes previously used to obtain a desired constant frequency. It is also useful for obtaining high voltage values in triggering electronic flash tubes. By increasing the frequency through changes in the values mentioned above the frequency with which the load circuit is actuated may be raised to a value higher than that needed for persistence of vision, whereby a steady instead of a flashing light source may be actuated.

Another use for this invention is in electric fence units. Common practice is to operate such devices from electro mechanical timers, which involve moving parts and which may be critical with respect to operating position. By this invention uniformly timed electrical pulses may be supplied to the primary of a voltage step-up transformer without resort to moving parts and with complete freedom of operating position. Furthermore, no power is required to operate a mechanical actuator.

To illustrate the degree to which the load actuating battery B-2 may be discharged without affecting the frequency of operation, the following data were found by investigation:

| B2 Battery, Volts | Series Resistance [1] added to R3, ohms | Flashes Per Minute | Avg. B2 Current, Milliamperes |
|---|---|---|---|
| 135 | 270 | 48 | 3.2 |
| 125 | 320 | 48 | 3.05 |
| 115 | 415 | 48 | 2.9 |
| 105 | 585 | 48 | 2.6 |
| 95 | 910 | 48 | 2.3 |

[1] In series with low resistance battery to simulate internal resistance of National Carbon Company No. 482 batteries in various conditions of discharge.

This invention relates to a method of producing electrical pulses. The battery B2 furnishing power for the load circuit, is therefore required to provide relatively high currents for short intervals. Under these conditions it is good practice to use a condenser 12 of say 100 to 500 microfarads connected directly across the battery. This condenser stores energy during the off period and releases it when the load is on, giving substantially improved performance as the battery is discharged.

The 482 battery is a 45 volt "B" battery of the flat cell Leclanché type, three of them when connected in series giving 135 volts. The IC21 tube is a gas triode of the cold cathode, glow-discharge type manufactured by Radio Corporation of America.

What is claimed is:

1. A device of the character described including a relaxation oscillator having a plate load circuit comprising a gaseous discharge tube to close said plate circuit, the rate at which the said plate load circuit is closed being determined by a first battery and an associated resistance-capacitance network in the grid circuit of said gaseous discharge tube, a condenser for supplying the plate current, a second battery for charging said condenser, a resistance in series with said second battery and condenser for controlling the time required for the condenser to be charged, the combination therewith of a second condenser placed directly in shunt with only said second battery to extend the operating range of voltage from said second battery within which the frequency of discharge from said tube is constant.

2. A device of the character described which comprises a relaxation oscillator including a gaseous discharge tube having a grid circuit comprising a first battery and an associated resistance-capacitance network for energizing the tube to its ionization potential and having a plate circuit which is completed when the ionization potential of the tube is reached, a condenser in said plate circuit, a second battery connected for charging said condenser, and a resistance in series with said second battery and condenser for controlling the time required for the condenser to be charged, a relay coil in series with the condenser and the plate of the said tube which closes a pair of associated contacts when the tube conducts, said contacts being adapted to complete a relatively high current load circuit which is connected to the two terminals of said second battery, the combination therewith of a second condenser placed in shunt across said second battery to extend the operating range of voltage from said second battery within which the frequency of discharge from said tube is constant.

3. A device of the character described which comprises a relaxation oscillator including a gaseous discharge tube having a control grid, cathode, and plate, self-sustaining means in the grid circuit comprising a first battery and an associated resistance-capacitance network for controlling the oscillations of the circuit and maintain them constant over a wide range of plate voltage, a plate circuit including a condenser and a relay coil in series with the tube, a second battery connected to charge the condenser, a resistance in series with said second battery and condenser for controlling the time required to charge the condenser, a pair of contacts associated with the relay coil, said second contacts being adapted to complete a relatively high current load circuit which is connected to the two terminals of said second battery, the combination therewith of a second condenser placed in shunt across said second battery to extend the operating range of voltage from said second battery within which the frequency of discharge from said tube is constant.

4. A device of the character described which comprises a relaxation oscillator having in the grid circuit thereof means including a first battery and an associated resistance-capacitance network for maintaining constant output frequency over wide variations of plate voltage, the combination in the plate circuit of the oscillator tube of a second battery which indirectly supplies plate current by charging a first condenser during off periods of the oscillator and also furnishes power to an external load controlled by the oscillator through charging a second condenser which is connected in parallel with said second battery and said load.

References Cited in the file of this patent

UNITED STATES PATENTS 2,415,944   Fagen _____ Feb. 18, 1947

UNITED STATES PATENT OFFICE
CERTIFICATE OF CORRECTION

Patent No. 2,864,009                                                  December 9, 1958

Paul A. Marsal et al.

It is hereby certified that error appears in the printed specification of the above numbered patent requiring correction and that the said Letters Patent should read as corrected below.

Column 4, line 52, after "said" strike out -- second --.

Signed and sealed this 7th day of July 1959.

(SEAL)
Attest:

KARL H. AXLINE                                               ROBERT C. WATSON
Attesting Officer                                            Commissioner of Patents